Feb. 29, 1972     T. C. HAGER     3,646,186
PROCESS FOR PRODUCING CONTINUOUS ROUND JACKETED LIGHTGUIDES
Filed June 5, 1970
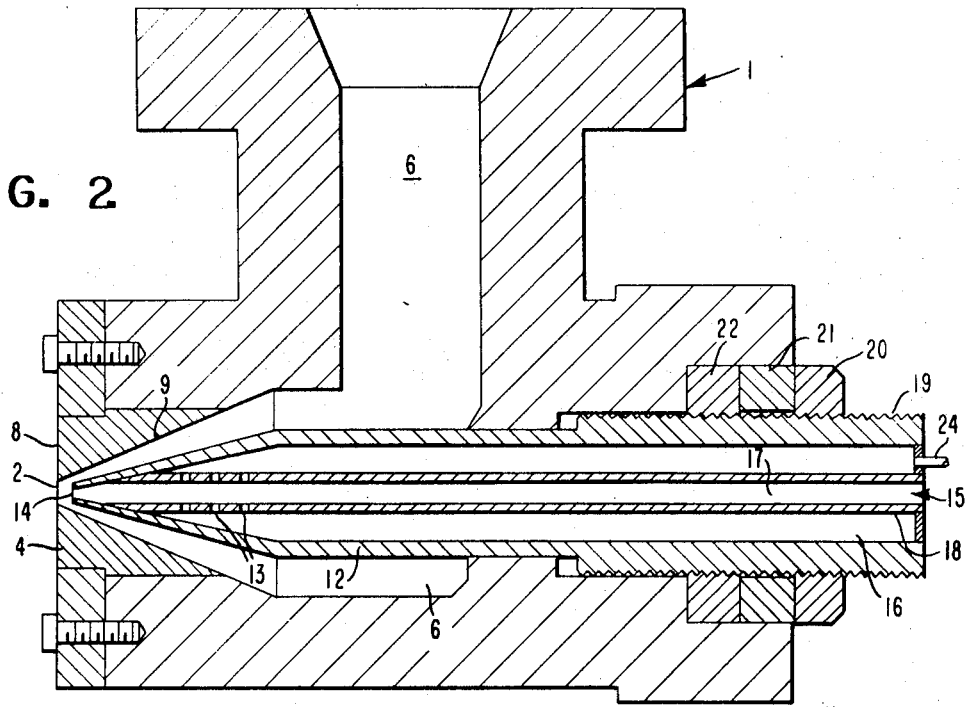
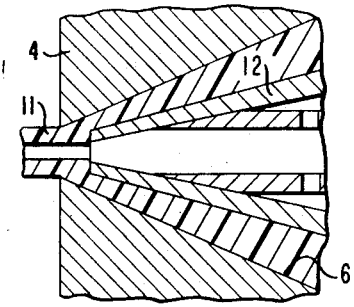
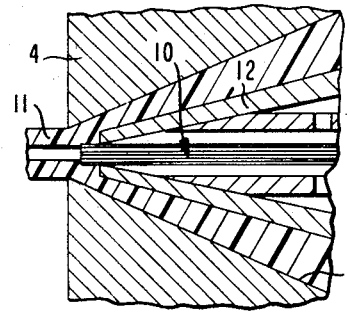
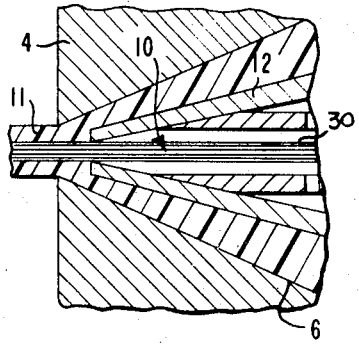
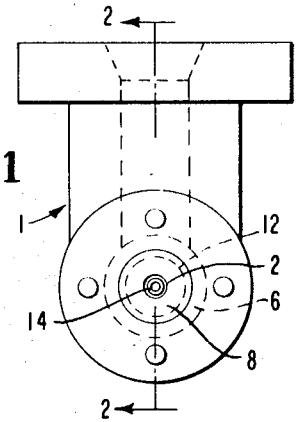
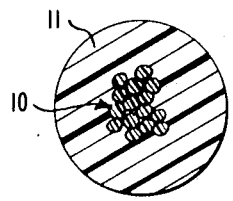
INVENTOR
THOMAS C. HAGER

United States Patent Office 3,646,186
Patented Feb. 29, 1972

3,646,186
PROCESS FOR PRODUCING CONTINUOUS
ROUND JACKETED LIGHTGUIDES
Thomas C. Hager, Washington, W. Va., assignor to E. I. du Pont de Nemours and Company, Wilmington, Del.
Continuation-in-part of application Ser. No. 600,919, Dec. 12, 1966. This application June 5, 1970, Ser. No. 43,701
Int. Cl. B29d 11/00; B29f 3/10; G02b 5/16
U.S. Cl. 264—174
3 Claims

ABSTRACT OF THE DISCLOSURE

Process and apparatus for protectively jacketing a bundle of polymeric filaments by simultaneously extruding a protective jacket and contacting the bundle with the jacket before the jacket contacts the extrusion orifice.

---

This application is a continuation-in-part of copending application U.S. Ser. No. 600,919, filed Dec. 12, 1966, now abandoned.

This invention relates to the jacketing of continuous plastic optical filamentary material to produce a lightguide in which the filamentary material is tightly jacketed and the jacket is round.

Plastic optical filamentary material is defined as being sheathed plastic filaments or fibers which are capable of transmitting light over long straight or curved lengths. Suitable plastic optical filamentary material that can be used in the practice of this invention is described in British Pat. No. 1,037,498, entitled "Light Transmitting Filaments." The process of this invention can be used to protectively jacket plastic optical filamentary material of any composition and diameter.

There are two general types of jacketing processes: pressure type extrusion process and tubing type extrusion process. Both processes have been unsuccessful in producing light-guides in which the plastic optical filamentary material is satisfactorily tightly jacketed and the jacketing is round.

The most serious problem in jacketing plastic filamentary material is that many presently available optical filamentary materials are heat sensitive to temperatures above 130° C. In extrusion jacketing processes, the extrudable jacketing material is at a temperature well in excess of 130° C. within the extruder. Thus, the jacketing material must not be allowed to remain in prolonged contact with the plastic filaments within the extruder or degradation will occur.

In a pressure type extrusion process, the filamentary material is subjected to the high temperatures and pressures of the extrudable material for a sufficient period of time to cause such degradation. Thus, the maximum temperature limit of the filamentary material is easily exceeded. In addition, the pressure-type extrusion process could not be used to jacket a multistrand or bundle of filamentary material because the bundle is not round and would fail to seal the outlet of the filament guide within the extruder which results in leakage of the extrudable material back into the filament guide.

In a tubing-type extrusion process, the major problem faced is that on extrusion of the plastic tube, the inner diameter of the plastic tube is larger than the outer diameter of the filamentary material which results in a loose fit. It is important that the filaments be held firmly at each end of the lightguide for efficient pick-up and display of light. Lightguides prepared using a loose jacket require that the ends be specially treated by potting or clamping to immobilize the ends. This problem can be partially solved by stretching the tubing while it is being drawn down around the filamentary material, but this creates stresses in the tubing which cannot be relieved on a production line basis due to the low heat tolerance of the plastic filamentary material. Due to these stresses, the tubing or jacket may later shrink when subjected to in-service temperatures leaving the filamentary material exposed and possibly yielding a kinked lightguide. An additional problem is that the tubing, when stretched, takes the shape of the bundle which may vary from oval to round or from flat to square. The resultant cross-sectional irregularity of the lightguide causes great difficulty in processing through automatic cutting machines and machines used for crimping fittings onto the lightguide.

The process of this invention provides a continuous plastic jacketed plastic optical lightguide of high quality in which the bundle of plastic optical filaments is held tightly together in a round protective jacket.

This invention is a process for jacketing polymeric optical filaments to produce a protectively jacketed lightguide product of substantially uniform diameter comprising the steps of extruding a jacketing material through a die orifice having a land up to 20 mils in length from an annular section of a melt reservoir defined by a melt chamber and the exterior surface of a filament guide to form a tube, the filament guide terminating spaced from said orifice and within the reservoir, the outer diameter of said tube being formed on the die orifice, and simultaneously within said tube and while said tube is forming passing one or more polymeric optical filaments through the filament guide, and passing gas through said filament guide to cool the optical filaments in said guide, and prior to passing said optical filaments through said guide adjusting the spacing between the end of said filament guide and said orifice an amount defined by a Y factor of 6–40% where $$Y = \left[ \frac{(\text{bundle O.D.} - \text{tubing I.D.})}{\text{bundle O.D.}} \right] \times 100$$

whereby in the space defined by the die orifice and the terminus of the filament guide jacketing material passes about and is in intimate contact with said optical filaments; and passing said jacketed lightguides through said die to form a uniform outside diameter on said jacketed lightguides. Preferably, Y is between 15–28% and the polymeric optical filaments are in the form of a substantially untwisted bundle.

This invention also comprises apparatus for protectively jacketing optical filaments of a first polymeric material with a second polymeric material whereby the first material is exposed for only short duration to elevated temperature and which protectively jacketed product has a substantially uniform outside diameter, said apparatus comprising Means for introducing said second polymeric material to a melt reservoir,
A melt reservoir,
A die orifice,
A tubular filament guide member,
Said melt reservoir containing therein said tubular filament guide member axially disposed with said reservoir and spaced from said die orifice,
Said tubular member on the end disposed toward said orifice having converging configuration on its exterior surface and the inner walls of said melt reservoir in the region of said orifice forming a converging surface, the converging surfaces of said reservoir and said tubular member forming a converging annular passage for the flow of said second polymeric material,
The inner surface of said tubular member disposed to receive optical filamentary material from outside said chamber at its end opposite to that disposed to the die orifice and the inner surface of said tubular member disposed to receive and discharge cooling gas, The end of said tubular member disposed toward said orifice being spaced therefrom in an amount defined by a Y factor 6 to 40% where $$Y = \left[ \frac{(\text{bundle O.D.} - \text{tubing I.D.})}{\text{bundle O.D.}} \right] \times 100$$

said orifice having a land of from 0 to 20 mils, whereby the second polymeric material passing around said tubular member flows about polymeric optical filaments of said first polymeric material in the space between the end of tubular member and said orifice before being extruded through said die to form a protectively jacketed light guide of substantially uniform diameter. Preferably Y is between 15% and 28%.

This and other embodiments of this invention will be hereinafter described with reference to the following numbered drawings:

FIG. 1 shows a schematic end elevation of an extruder cross-head;

FIG. 2 shows an enlarged section of FIG. 1 taken on line 2—2;

FIG. 3(a) shows an enlarged section of the die and filament guide of FIG. 2 producing a plastic tubing;

FIG. 3(b) shows the section of the die and filament guide of FIG. 3(a) as a bundle of plastic optical filaments are being fed through the filament guide;

FIG. 3(c) shows the section of the die and filament guide of FIG. 3(b) with the buidle of plastic optical filaments completely filling the plastic tubing;

FIG. 4 shows an enlarged cross-section of a bundle of plastic optical filaments;

FIG. 5 shows an enlarged cross-section of the finished lightguide of this invention in which the bundle of plastic optical filaments are jacketed in a protective plastic jacket.

Referring to the drawings, FIG. 2 shows an extruder cross-head 1 including structure defining an extrudate chamber 6, a circular die 4 at one end of the chamber and a tubular filament guide 12 extending longitudinally within the chamber. The die 4 has an outer or die face 8 and an inner face of a uniformly converging surface 9 which terminates into the die face 8 to form an orifice 2. The filament guide 12 has threads 19 designed to engage a fixed nut 22 and is adjustable along its longitudinal axis which intersects the center of orifice 2, by screwing the filament guide into or out of the fixed nut. The guide can then be locked in place by tightening the locking nut 20 that is separated from the fixed nut 22 by a nut spacer 21. Any other conventional filament guide adjustment means can also be used. The tubular filament guide 12 has a filament outlet 14 which communicates with the extrudate chamber 6 and is recessed from the die face, a filament inlet 15 which communicates with the atmosphere, and a filament tube 18, which longitudinally divides the interior of the filament guide into an inner chamber 17 and a concentric outer chamber 16. The filament tube 18 has holes 13 therein which allow chambers 16 and 17 to communicate. Chamber 16 is connected to a source of suction (not shown) through valve 24 to produce a vacuum within the inner chamber 17 by withdrawing air from chamber 16 slightly faster than it can enter chamber 17 through inlet 15.

As shown in FIG. 3(a), molten extrudate is received from an extruder (not shown) by extrudate chamber 6, and the extrudate flows around the tapered end of the filament guide 12 and out orifice 2 in the form of a tubing 11. The filament guide 12 is longitudinally adjusted within the extrudate chamber so that the outlet is recessed from the die face 8 sufficiently to produce an inner diameter of tubing [I.D. in Equation I] which is less than the outer diameter as hereinafter defined of the optical filamentary material to be packeted with the tubing.

The outer diameter of filamentary material of irregular cross-section can be considered as the outer diameter of an equivalent essentially circular area.

The filamentary material in the form of a bundle 10 of optical filaments is passed through the inner chamber 17 or filament tube 18 of the filament guide 12 and into the interior of tubing 11 as is shown in FIG. 3(b). Upon continuing passage of the bundle 10 through the filament 12 and extrusion of the tubing 11, the entire interior of the tubing becomes occupied with the bundle as shown in FIG. 3(c).

The spacing between the tip of the filament guide and the die orifice is adjusted such that Y as defined by Equation I below is between 6 to 40% and preferably 15 to 28%.

$$Y = \left[ \frac{(\text{bundle O.D.} - \text{tubing I.D.})}{\text{bundle O.D.}} \right] \times 100$$

all terms as hereinbefore defined.

The tubing I.D. as discussed with relation to FIG. 3(a) is the inner diameter of a tubing jacket extruded through the equipment at a given spacing of filament guide to die orifice without the presence of the filaments to be protectively jacketed.

The vacuum present within the filament guide 12 maintains the intimate contact between the bundle 10 and tubing 11 obtained within the die as the tubularly jacketed bundle leaves the die 4. The vacuum also improves penetration of the extrudate melt into the bundle within the die to improve the tightness of fit. In addition, the vacuum produces a cooling effect on the bundle and filament tube 18, by movement of air through chambers 16 and 17 as above described.

The intimate contact between bundle 10 and tubing 11 obtained within the die dispenses with the need for any substantial amount of drawing of the tubing after it leaves the die. Thus, stresses are not created in the tubing to the extent that such stresses might later, in service, be relieved, causing kinking of the lightguide and relative movement between optical filaments and tubing (protective jacketing material).

The optical filamentary material to be jacket by the process of this invention can be in the form of a single filament or a bundle thereof, i.e., more than one filament running contiguously with one another. Generally, the filaments of the bundle will be untwisted with respect to each other, resulting in a bundle of irregular cross-section, a factor which makes the extrudate melt backwards flow problem particularly acute, but which is overcome by the process of the present invention.

FIG. 4 shows a cross-section of a bundle 10 of untwisted optic filaments 30 which can be passed through the filament guide 12 for jacketing according to the present invention. This figure also shows the irregularity of the cross-sectional outline of the bundle.

In FIG. 5, the bundle 10 of FIG. 4 is shown with a tight protective plastic jacket of tubing 11 applied according to the present invention. The cross-sectional outline (outer surface) of the tubing is round, despite the irregular outline of the bundle 10. The tubing 11 has penetrated the bundle 10 rendering its filaments, for practical purposes, immobile with respect to one another and to the tubing. In addition, the bundle 10 is well centered within the tubing.

Suitable materials for use in jacketing optical filamentary material by the process of the present invention are any of those materials which are extrudable into a tubing under the conditions hereinbefore described without degrading the particular filamentary material being used as a core and which have a protective quality for the filamentary material. The jacketing material should be nonreactive, in the sense that the optical quality of the filamentary material is adversely effected, with the optical filamentary material during jacketing and subsequent use.

Examples of suitable jacketing materials include natural and synthetic rubber and α-monoolefin polymers and copolymers, such as polyethylene, preferably having low or medium density, and polypropylene, and vinyl chloride polymers and copolymers each containing non-migratory plasticizers.

Preferably, the converging surface 9 of the die 4 terminates at the die face 8, as shown in FIG. 2, in order that outlet of the filament guide 12 can be positioned as closely as possible to the die face yet recessed therefrom to produce the fit between desired protective jacketing tubing 11 and the optical filamentary material. A small amount of land defining orifice 2 may be present between the die face and the converging surface in order to minimize orifice wear. As this land is increased, so does back pressure. Consequently, as small a land as possible should be used in carrying out the process of this invention. Exemplary of the amount of land that can be used is land up to 20 mils wide (distance between die face at orifice and converging surface at orifice) which gives an orifice of corresponding length.

The outer diameter of filamentary material or irregular cross-section can be considered as the outer diameter of an equivalent essentially circular area.

EXAMPLES

A number of runs were made according to the following general procedure: An adjustable filament guide and die designed and fabricated as above-described were installed in a standard extruder cross-head with the filament guide outlet recessed from the die face to produce an extruded tubing having an inner diameter smaller than the outer diameter of the optical filamentary material to be jacket. The filament guide was longitudinally adjusted in order to vary the interference fit and jacket thickness. Then the optical filamentary material was passed through the filament guide and was jacketed with tubing. Details of these runs are given in the following table. The optical filamentary material in runs 1–13 is polymethylmethacrylate sheathed in a fluoroalkyl methacrylate polymer as described in British Pat. No. 1,037,498, and in run 14 is polystyrene sheathed in polymethylmethacrylate.

TABLE I.—MATERIALS

| | Optical filamentary material | | | Jacket material | | | |
|---|---|---|---|---|---|---|---|
| Run No. | No. filaments | Filament diameter (mils) | Bundle outer diameter (mils) | Material | Density at 23° C. | Melt index | Durometer hardness |
| 1 | 16 | 10 | 45 | Polyvinyl chloride [1] | 1.20 | | A scale, 82. |
| 2 | 16 | 10 | 45 | do [1] | 1.20 | | Do. |
| 3 | 32 | 10 | 65 | do [2] | 1.37 | | C scale, 79. |
| 4 | 16 | 10 | 45 | Polyethylene | 0.917 | 4.0 | |
| 5 | 16 | 10 | 45 | do | 0.917 | 4.0 | |
| 6 | 16 | 10 | 45 | do | 0.905 | 4.8 | |
| 7 | 16 | 10 | 45 | do | 0.905 | 1.5 | |
| 8 | 48 | 10 | 80 | do | 0.930 | 3.0 | |
| 9 | 64 | 10 | 92 | do | 0.930 | 3.0 | |
| 10 | 32 | 10 | 65 | Polyvinyl chloride [1] | 1.20 | | A scale, 82. |
| 11 | 4 | 20 | 47 | Polyethylene | 0.930 | 3.0 | |
| 12 | 1 | 20 | 20 | do | 0.930 | 3.0 | |
| 13 | 1 | 30 | 30 | do | 0.930 | 3.0 | |
| 14 | 16 | 10 | 45 | do | 0.930 | 4.0 | |

[1] Nitrile rubber plasticizer.
[2] Polymeric polyester plasticizer.

TABLE II.—CONDITIONS AND RESULTS

| Run No. | Melt temp. of jacket material (° C.) | Linear jacketing rate (f.p.m.) | Jacket thickness (mils) | Diameter of product (mils) | Filament guide outlet size (mils) | Die orifice size (mils) | Interference (mils) | Vacuum (in. of Hg) |
|---|---|---|---|---|---|---|---|---|
| 1 | 147 | 89 | 20 | 86 | 55 | 86 | 10 | 7 |
| 2 | 150 | 296 | 20 | 86 | 55 | 86 | 10 | 7 |
| 3 | 167 | 99 | 20 | 110 | 76 | 110 | 14 | 7.5 |
| 4 | 150 | 50 | 20 | 88 | 55 | 86 | 10 | 7.5 |
| 5 | 152 | 106 | 20 | 86 | 55 | 86 | 10 | 7.5 |
| 6 | 199 | 97 | 20 | 86 | 55 | 86 | 10 | 6 |
| 7 | 192 | 110 | 20 | 86 | 55 | 86 | 10 | 7 |
| 8 | 163 | 111 | 20 | 119 | 90 | 120 | 18 | 8 |
| 9 | 159 | 130 | 20 | 130 | 105 | 125 | 20 | 16.3 |
| 10 | 148 | 80 | 15 | 100 | 76 | 103 | 14 | 10 |
| 11 | 157 | 200 | 20 | 88 | 55 | 86 | 10 | 15 |
| 12 | 181 | 153 | 10 | 40 | 30 | 52 | 5 | 7.8 |
| 13 | 150 | 173 | 28 | 86 | 45 | 86 | 5 | 16.2 |
| 14 | 163 | 136 | 20 | 86 | 55 | 86 | 10 | 12.8 |

As many apparently widely different embodiments of this invention may be made without departing from the spirit of scope thereof, it is to be understood that this invention is not limited to the specific embodiments thereof except as defined in the appended claims.

I claim:

1. Process for jacketing polymeric optical filaments to produce a protectively jacketed lightguide product of substantially uniform diameter comprising the steps of extruding a jacketing material through a die orifice having a land up to 20 mils in length from an annular section of a melt reservoir defined by a melt chamber and the exterior surface of a filament guide to form a tube, the filament guide terminating spaced from said orifice and within the reservoir, the outer diameter of said tube being formed on the die orifice, and simultaneously within said tube and while said tube is forming passing one or more polymeric optical filaments selected from polymethylmethylacrylate sheathed in a fluoroalkyl methacrylate polymer or polystyrene sheathed in polymethylmethacrylate through the filament guide, and passing gas through guide to cool the optical filaments in said guide, and prior to passing said optical filaments through said guide adjusting the spacing between the end of said filament guide and said orifice an amount defined by a Y factor of 6–40% where $$Y = \left[\frac{(\text{bundle O.D.} - \text{tubing I.D.})}{\text{bundle O.D.}}\right] \times 100$$

whereby in the space defined by the die orifice and the terminus of the filament guide the jacketing material passes about and is in intimate contact with said optical filaments; and passing said jacketed lightguides through said die to form a uniform outside diameter on said jacketed lightguides.

2. Process of claim 1 wherein Y is between 15–28%.
3. Process of claim 1 wherein the polymeric optical filaments are in the form of a substantially untwisted bundle.

References Cited
UNITED STATES PATENTS

| | | | |
|---|---|---|---|
| 2,471,752 | 5/1949 | Ingmanson | 18—13 T |
| 2,546,975 | 4/1951 | Churnell et al. | 18—13 T |
| 2,656,566 | 10/1953 | Berggren | 264—174 |
| 2,698,269 | 12/1954 | Sussenbach | 161—176 |
| 2,790,202 | 4/1957 | Lorenian | 264—172 |
| 2,825,260 | 3/1958 | O'Brien | 264—1 |
| 2,902,754 | 9/1959 | Lorenian | 18—13 T |
| 2,956,305 | 10/1960 | Raydt et al. | 264—174 |
| 3,121,255 | 2/1964 | Henning et al. | 264—174 |
| 3,227,786 | 1/1966 | Cohen | 264—174 |
| 3,472,921 | 10/1969 | Fyfe | 264—1 |

JULIUS FROME, Primary Examiner

A. H. KOECKERT, Assistant Examiner

U.S. Cl. X.R.

18—13; 264—1; 350—96